United States Patent [19]

Hildebrandt

[11] 4,394,036

[45] Jul. 19, 1983

[54] PASSIVE SAFETY BELT ARRANGEMENT

[75] Inventor: Christian Hildebrandt, Gifhorn-Wilsche, Fed. Rep. of Germany

[73] Assignee: Volkswagenwerk Aktiengesellschaft, Wolfsburg, Fed. Rep. of Germany

[21] Appl. No.: 265,226

[22] Filed: May 19, 1981

[30] Foreign Application Priority Data

May 20, 1980 [DE] Fed. Rep. of Germany ....... 3019158

[51] Int. Cl.³ .............................................. B60R 21/02
[52] U.S. Cl. .................................... 280/804; 280/808
[58] Field of Search ....................... 280/804, 802, 808

[56] References Cited
U.S. PATENT DOCUMENTS 4,257,625 3/1981 Takada ................................. 280/804

4,272,104 6/1981 Cuny ................................... 280/808

Primary Examiner—Robert R. Song
Attorney, Agent, or Firm—Brumbaugh, Graves, Donohue & Raymond

[57] ABSTRACT

A passive safety belt arrangement for vehicles has a safety belt with one end connected to a slide by a manually-operable closing device. The slide, which can be displaced by a drive means along a guide held on the vehicle body moves between a release position in which the belt is lifted off the body of a vehicle occupant, and a restraining position in which the belt is applied to the body of the occupant. If the slide becomes stuck at a position remote from the restraining position, the belt can be manually applied by attaching it to a counterpart fastened to a stationary part located in the area of the restraining position.

4 Claims, 1 Drawing Figure

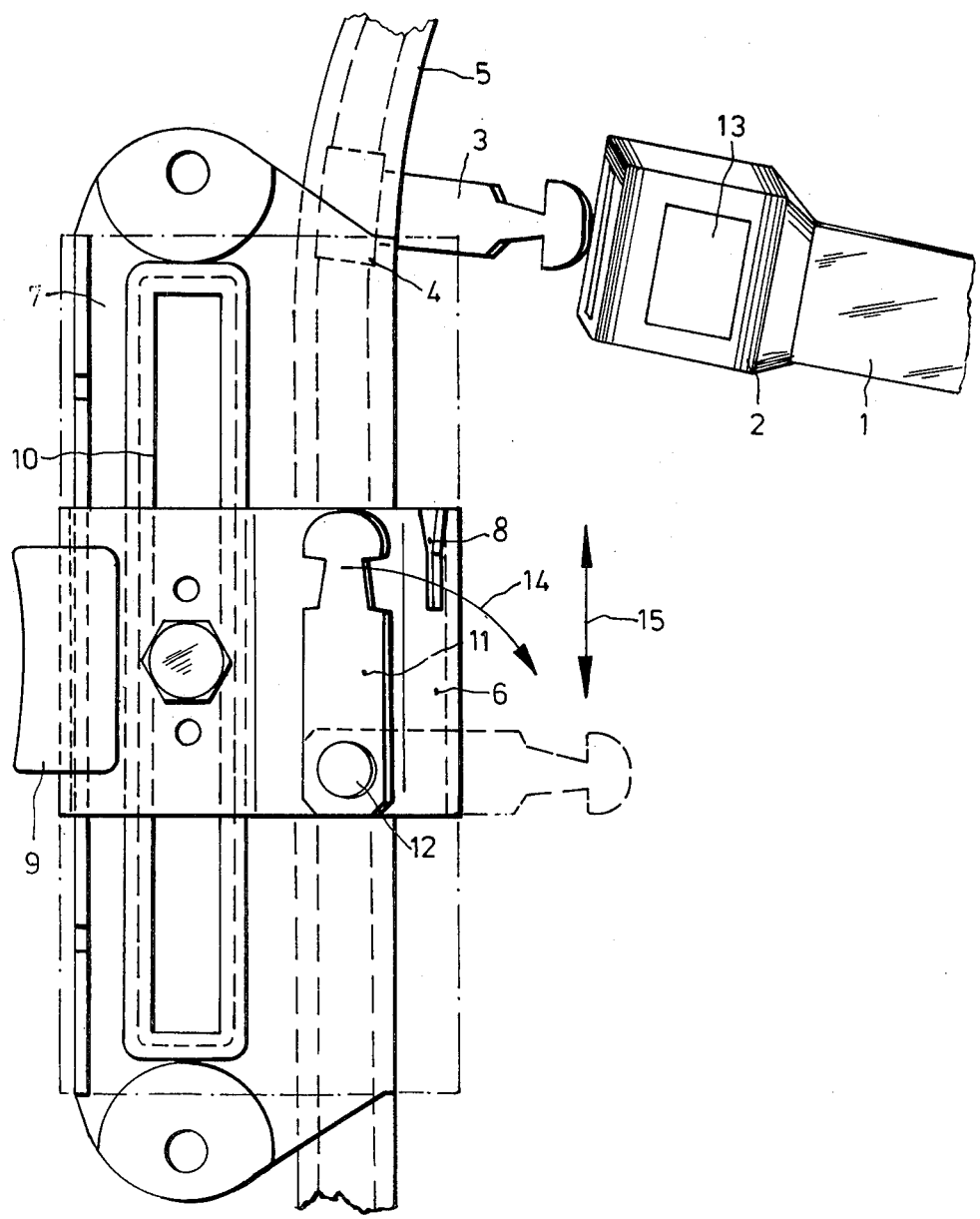

4,394,036

PASSIVE SAFETY BELT ARRANGEMENT

BACKGROUND OF THE INVENTION

The present invention relates to a passive safety belt arrangement for vehicles, in particular a passive safety belt arrangement for passenger automobiles in which operation of a door of the automobile operates the safety belt.

Passive safety belts having at least one belt end connected with a slide displaceable in a guide are known. Connection of the safety belt with the slide by means of a conventional manually-operable belt lock is also known. This type of connection allows for the removal of the belt in emergency situations or when the slide drive fails and the slide is in the restraining position. However, if the slide drive breaks down in a position other than the restraining position, the vehicle occupant can no longer properly secure himself with the belt and, in the event of an accident with the vehicle, he will be considerably endangered.

SUMMARY OF THE INVENTION

It is an object of the present invention to provide a means for securing a vehicle occupant with a safety belt of a passive safety belt arrangement even when the adjustment drive of the arrangement breaks down. This purpose is attained in accordance with the invention by providing a stationary counterpart or shackle at the restraining position of the belt slide, which counterpart is adapted to receive the belt lock.

In an illustrative embodiment of the invention a safety belt arrangement for vehicles is provided with a safety belt having one end connected by means of a manually-operable locking device with a slide. The slide is moved in a guide, which guide is held on the vehicle body, under the influence of a driving motor. Thus the slide moves between a release position in which the belt is lifted from the body of the vehicle occupant and a restraining position in which the belt is applied to the body of the occupant. A counterpart or shackle is stationarily positioned on the vehicle body in the region of the restraining position of the slide and is connectable to the locking device at the end of the belt. Due to the fact that the counterpart is located at a relatively stationary position in the region of the restraining position of the slide and the counterpart can be connected with the locking device of the belt end, the vehicle occupant can be secured by manual application of the belt even if the slide adjustment drive breaks down.

To accomplish this emergency application of the belt, it is only necessary for the belt end associated with the slide to be released from the slide by actuation of the locking device and subsequently connected with the counterpart, which is fastened in the region of the restraining position of the slide. Although the automatic operation of the passive safety belt arrangement is suspended by this change of belt position, manual securing of the occupant is ensured in cases of emergency.

BRIEF DESCRIPTION OF THE DRAWING

The foregoing and other features of an illustrative embodiment of the invention will be described in detail in conjunction with the accompanying drawing, which drawing shows a schematic plan view of the region of a belt guide associated with the restraining position of a slide of a passive safety belt system.

DESCRIPTION OF AN ILLUSTRATIVE EMBODIMENT

A safety belt includes, e.g., a diagonal shoulder belt 1 with a locking device 2 fixed at one end of the belt. The locking device 2 is operable by a push button 13. The end of the safety belt, which is not shown, is fastened in the pelvic zone of a vehicle occupant seated on the vehicle seat or it is fastened on the vehicle floor. Interposed between this belt end and its attachment to the vehicle is a conventional belt winding arrangement.

The locking device part 2 can be connected with a shackle 3 that is insertable into it and together they form a closing device. This shackle or counterpart for the locking device 2 is fixed to a slide 4 that is displaceable in a guide 5 fastened on the vehicle body. For example, the guide may be fastened above the door opening situated next to the vehicle seat equipped with the safety belt 1. Consequently, the slide can be displaced between a released position in which the belt is lifted off the vehicle occupant and the slide is located in the front roof side zone of the vehicle, and a restraining position in which the belt is across the occupant's chest and the slide is arranged on the door column (B column) at approximately the shoulder level of the vehicle occupant. Displacement of the slide is achieved by a drive (not shown) which may be constituted, e.g., by a cable line, toothed belt or the like, acting as a displacement element and driven, e.g., by an electric motor.

An anchoring element 6 is fixed in a force transmitting manner on the vehicle body, in this embodiment on the door column in the vicinity of the restraining position of the slide. This anchoring element 6 has a slot or clearance 8. The slide 4 runs into the anchoring element 6 and the insertable shackle 3 connected to the slide runs into clearance 8 during displacement of the mechanism into the restraining position. Thus in the restraining position the slide is held in a force-transmitting manner to the door column by the anchoring element so as to introduce the restraining forces which occur in the safety belt 1 during a restraining event, e.g. an accident, safely and directly into the vehicle body.

In the embodiment shown in the drawing the anchoring element 6 can have its vertical position adjusted by displacing it to one of several positions along a guide rail 10 of a guide element 7 that is rigidly fastened to the door column. After the displacement, the anchoring element can be locked in the selected position by a locking element (not shown). The purpose of such a level adjustment is to allow for the adjustment of the restraining position of the slide 4, and thereby of the safety belt 1, to the various body sizes of vehicle occupants. Towards this end the anchoring element 6 is provided with a push button 9 for disengagement of its locking element. Following actuation of the button 9, e.g., by the application of a lateral force, the anchoring element 6 can be displaced in the directions of the arrow 15, i.e. upward or downward, for adjustment of the restraining position of the body size of the vehicle occupant.

On the anchoring element 6 there is also fixed a counterpart or shackle 11 that is pivotable around a pivot point 12 and is insertable in the belt locking device 2. Shackle 11 is provided for emergency use in order to facilitate manual belt application regardless of the position of the slide 4. This manual belt application allows the occupant of the vehicle to be safely held on the seat, even if the slide adjustment drive breaks down. In order to effect this manual application of the belt, locking device 2 must initially be released from shackle 3 by actuation of the push button 13. Then the necessary insertable shackle 11 is pivoted down in the direction of arrow 14 so that belt locking device 2 can be connected with this shackle. Due to the fact that the emergency insertable shackle 11 is fastened on the anchoring element 6, it is adjustable in height. Thus it is ensured that, in case of an emergency, the belt can always be anchored at a level adjusted to the body size of the vehicle occupant and an optimal belt course is obtained.

While the invention has been particularly shown and described with reference to a preferred embodiment thereof, it will be understood by those skilled in the art that various changes in form and details may be made therein without departing from the spirit and scope of the invention.

I claim:

1. A passive safety belt arrangement for vehicles, for example passenger automobiles, has a safety belt with one end being connectable, by means of a manually-operable closing device, with a slide which can be displaced by a drive means, said slide being displaceable in a guide held on the vehicle body between a release position, in which the belt is lifted off the body of a vehicle occupant, and a restraining position, in which the belt is applied to the body of the vehicle occupant, characterized in that in the region of the restraining position of the slide, a counterpart, which is connectable with the a part of the closing device at the belt end, is fastened to a stationary point on the vehicle body.

2. A passive safety belt arrangement as claimed in claim 1, characterized in that the closing device includes a locking device fixed to the belt end and the counterpart comprises an insertable shackle pivotable about the stationary point on the vehicle body, which shackle can be connected with the locking device fixed to the belt end.

3. A passive safety belt arrangement as claimed in claim 2, characterized in that the insertable shackle is fixed on an anchoring element arranged in the region of the restraining position of the slide, said anchoring element being fastened to the vehicle body so as to establish a direct transmission of restraining forces from the belt to the vehicle body.

4. A passive safety belt arrangement as claimed in claim 3, characterized in that the anchoring element position is adjustable in height.

* * * * *